Dec. 25, 1928.                                                    1,696,841
R. L. EDISON
LIQUID MEASURING AND DISPENSING APPARATUS
Filed Feb. 12, 1925          2 Sheets-Sheet 2
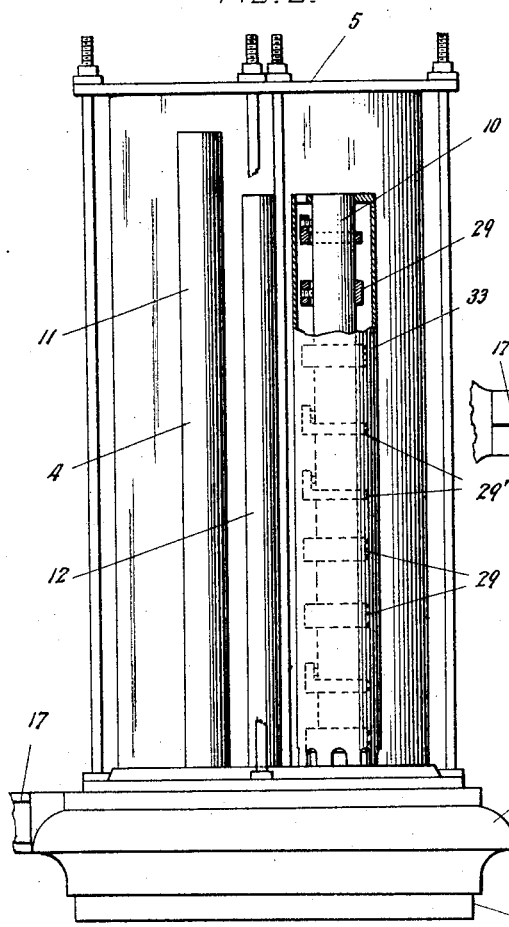
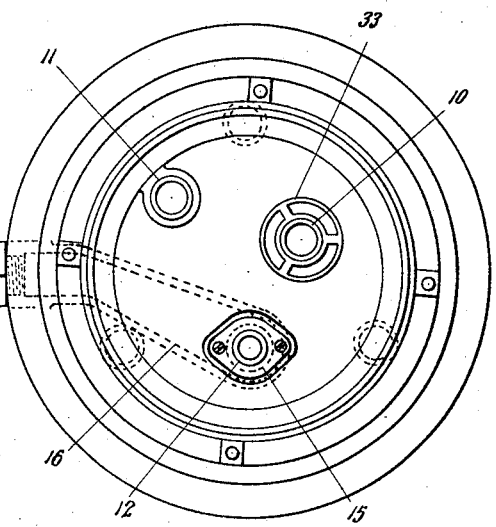
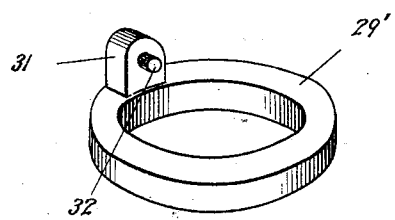
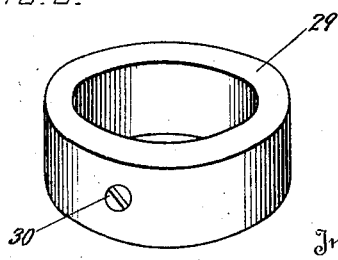
Inventor:
RUSSELL L. EDISON
By Edgar M. Kitchin,
his Attorney.

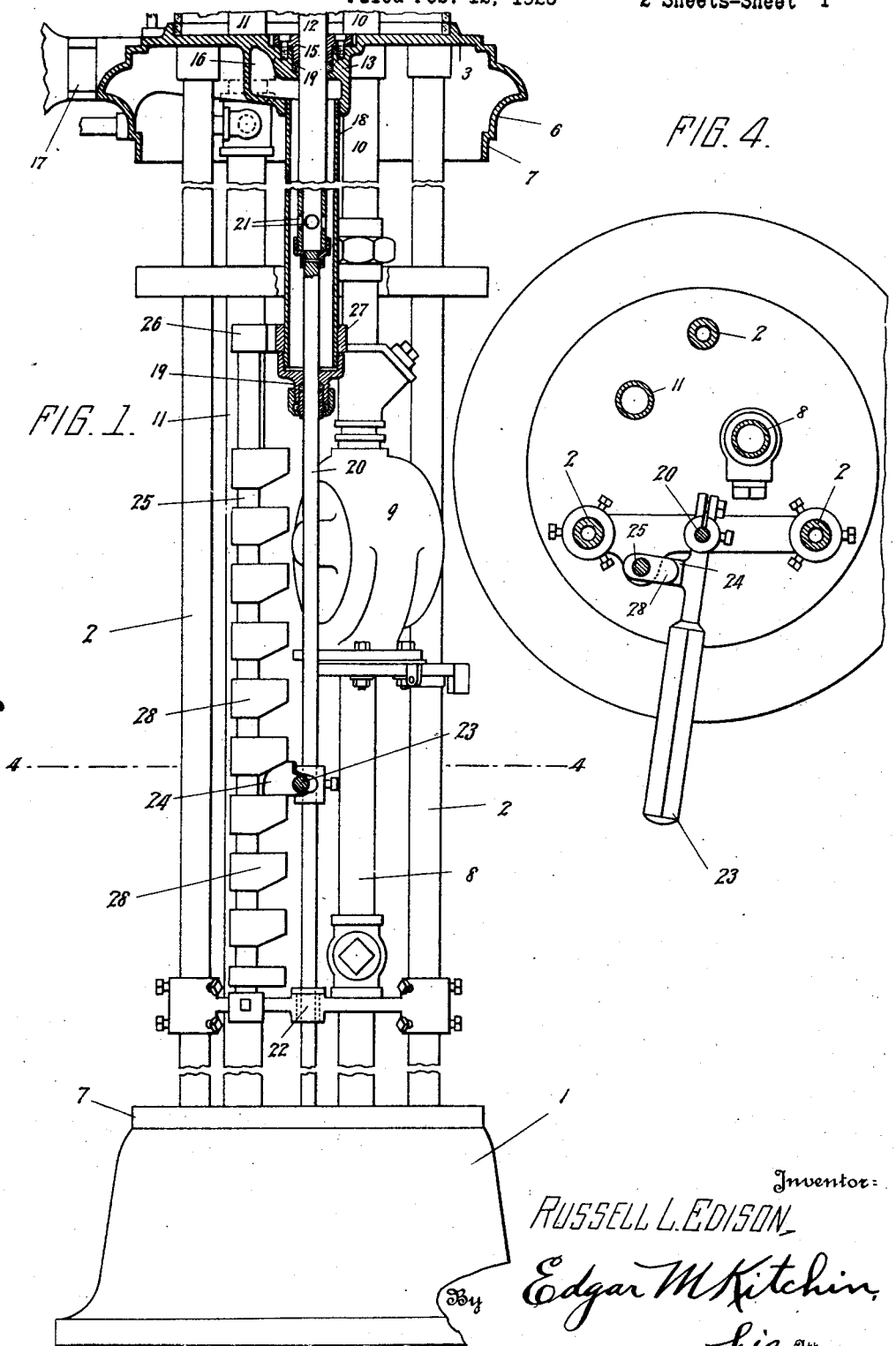

Patented Dec. 25, 1928.

1,696,841

UNITED STATES PATENT OFFICE.

RUSSELL L. EDISON, OF GRAND RAPIDS, MICHIGAN, ASSIGNOR, BY DIRECT AND MESNE ASSIGNMENTS, TO FLECKENSTEIN PUMP COMPANY, OF GRAND RAPIDS, MICHIGAN, A CORPORATION OF MICHIGAN.

LIQUID MEASURING AND DISPENSING APPARATUS.

Application filed February 12, 1925. Serial No. 8,729.

This invention relates to improvements in liquid measuring and dispensing apparatus, and more particularly to such as is especially adapted for delivery of measured quantities of fluid fuel from a general supply to a fuel tank or the like.

The object in view is the obtaining of substantial precision in the quantities measured by the employment of simple, efficient and easily operated apparatus.

With these and further objects in view as will in part hereinafter become apparent and in part be stated, the invention comprises certain novel constructions, combinations and arrangements of parts as subsequently specified and claimed.

In the accompanying drawings,—

Figure 1 is a view partly in vertical central section and partly in elevation of an apparatus embodying the features of the present invention, parts being broken away and intermediate parts being broken out.

Figure 2 is a view similar to Figure 1 of the upper portion of the apparatus including the measuring tank, lower portions of the apparatus being omitted, and the sliding dispense tube being indicated in its uppermost position.

Figure 3 is a top plan view of the parts seen in Figure 2.

Figure 4 is a transverse section taken on the plane indicated by line 4—4 of Figure 1, and looking downward.

Figures 5 and 6 are perspective views of displacement elements, seen on an enlarged scale.

Referring to the drawings by numerals, 1 indicates a base which may be of any ordinary form from which upstands the supporting columns 2, 2, having mounted upon their upper ends the bottom plate 3 of the measuring container 4. The said measuring container consists preferably of a glass cylinder closed at its bottom by the bottom plate 3 and at its top by a plate 5. The measuring container may, of course, be made of other material than glass, and it will be observed that the invention, as hereinafter set forth, will operate just as efficiently without reference to the material of which the measuring container is made.

The bottom plate 3 is preferably provided with an integral, annular flange forming a cornice or capital 6 at the upper portion of the standards 2, and the said capital and base 1 are preferably rabbeted at 7, 7, to receive the ends of an enclosing housing, not illustrated, but adapted to be employed for protecting the parts between the base 1 and the bottom plate 3 from climatic conditions, and also adapted to give a finished appearance to the complete apparatus.

Extending from a source of supply, such as a buried supply tank, is a pipe 8 communicating with a pump 9, which pump discharges into a pipe 10, leading up through and discharging within the upper portion of the measuring container 4. Pump 9 is of any ordinary, conventional type, preferably electrically driven, but obviously susceptible of any preferred operation. A drain back or overflow pipe 11 extends upwardly from base 1 into the measuring container 4 to a point representing the maximum measuring capacity of the container, and is open at its upper end to receive and drain back any liquid delivered to the container 4 in excess of that providing a liquid level identical with the level of the upper or intake end of pipe 11. The lower portion of pipe 11, not illustrated, communicates preferably with the source of supply for returning thereto or draining back any excess liquid pumped into container 4.

A sliding dispensing tube 12 extends through the bottom plate 3 of the container 4, and said bottom plate is provided with a packing boss 13 surrounding the tube 12 and containing the packing 14 engaged by an ordinary packing gland 15 for insuring a non-leaking joint between the bottom of the container 4 and the sides of the tube 12. A discharge port 16 leads laterally from the point just beneath the under face of the boss 13 and communicates with the nipple 17 of the control valve, not illustrated, which communicates with the discharge hose through which the fluid is to be delivered to the automobile supply tank or elsewhere as required. The walls of the port 16 are preferably formed as an integral casting with the plate 3, but, of course, may be otherwise formed as desired, and engaging said walls and having communication with said port is a depending discharge well 18, which extends downwardly below plate 3 to the distance required for accommodating the necessary thrust of the sliding dispense tube 12. The lower end of the discharge well 18 is preferably closed by a cap 19 penetrated by a rod 20 having appropriate packing within the cap 19 for providing a sliding or non-leaking connection between the rod 20 and the cap 19. The upper end of rod 20 is anchored to the lower end of the sliding dispense tube 12, and, since such anchorage as a matter of facility preferably closes the lower end of tube 12, the said tube is provided with lateral discharge openings 21, 21, communicating with the well 18. The rod 20 extends downwardly through an appropriate guide 22, preferably carried by the standards 2, the guide being alined with the pasageway through the cap 19, and the rod 20 extending below the guide 22 sufficiently for allowing the rod to be thrust longitudinally for the length of the required travel of the sliding dispense tube 12. A handle 23 is preferably detachably fixed to the rod 20, and is provided with a lateral lug or projection 24 having preferably an under, straight or flat face and an upper, inclined or cam face, as clearly seen in Figure 1. A bar 25 is appropriately fixed at its lower end to an outstanding projection on the support for the guide 22, and at its upper end is anchored in a cap 26 outstanding laterally from a ring 27 surrounding and appropriately fixed to the lower portion of the discharge well 18. Laterally projecting lugs 28, 28, outstand from and are either formed integral with or appropriately fixed to the bar 25 and spaced preferably approximately uniformly apart. The upper face of each lug 28 is preferably flat or straight, while the other face is inclined to cooperate with the inclined upper face of the lug 24 for camming the lug downward when the two inclined faces meet, so as to cause the under or flat face of lug 24 to rest against the upper or flat face of the next lug 28 below upon the handle 23 being swung laterally until the camming or inclined upper face of lug 24 strikes the inclined under face of any one of the lugs 28. Thus it will be seen that the tube 12 may be positioned at any of a series of places, raised or lowered, according to the location of the handle 23, and any desired position will be attained with precision incident to the relative action of the lugs 24 and 28. The space vertically from the upper flat face of any lug 28 to the upper flat face of the next lower or next higher lug is equal to an area in container 4 representing an approximately fixed or measured quantity capacity therein. Or, in other words, the containing capacity of the container 4 for that space existing between the vertical plane of the upper end of tube 12, when the lug 24 is resting against one of the lugs 28, and the plane of the upper end of tube 12, when the lug 24 is resting against the next adjacent lug 28, is a fixed, measured quantity, say, for example, one gallon. But it has been found difficult to make containers similar to container 4 sufficiently inexpensive for practical commercial purposes with such precision as to insure exact measurement. Irregularities in dimensions or proportions are liable to occur, and, accordingly, some spaces, each of which should measure one gallon are liable to measure a little more or possibly in some instances a little less. When that occurs it is desirable to compensate for the difference between the actual measurement and exact measurement, so that the liquid discharged will be the exact measurement and neither more nor less than the exact quantity required. To accomplish this end, it has heretofore been proposed to vary the extent of the thrust or movement of the part which controls either the liquid level within the container or the final liquid level of the container when the discharging of the measured quantity was completed. Difficulty has been experienced, however, in the necessary variable adjustment, and the difficulties thus presented are all overcome by the present invention, which provides for varying the containing capacity of the container 4 at different points or places in said container until the successive spaces therein shall possess a capacity exactly that required for precise measurement.

This variation in containing capacity may be accomplished in any one of numerous ways, one of which is illustrated in Figures 2, 5 and 6. It consists in providing displacement masses adapted to be located in various parts of the container 4 for causing the areas thereof to possess exact containing capacity as required. Such masses may assume different forms, as, for example, a relatively large ring or collar 29 is provided with a set screw 30, said collar being designed to be removably applied in position to surround the filler tube 10 and to be clamped thereto by the action of the set screw 30. As many rings 29 of different sizes may be utilized as required. When a ring of relatively small displacing capacity is required, a structure such as seen at 29' is provided, consisting of a relatively thin ring having an upstanding lug 31 carrying the clamping set screw 32, the ring 29' being adapted to be applied on the tube 10 in the same manner as ring 29.

The rings 29 and 29' are applied to the tube 10 preferably because that tube is fixedly mounted, but the said rings may be sustained within the container 4 by any appropriate means adapted to maintain the required position of such rings. Because of the lack of the probable neatness in appearance of irregularly spaced and irregularly sized rings mounted on the tube 10, the said tube and rings may be enclosed in a relatively thin casing or shell 33 open at its ends to allow the free entrance and exit of liquid. When the shell 33 is employed, the size of the container 4 is proportioned to accommodate such shell while maintaining its required containing capacity.

The application of the displacing masses or elements in numbers, sizes, and locations as required to insure exact precision of the containing capacity of the respective areas of measuring container 4 may be determined in any of several ways, the simplest of which is the introduction of a measured quantity into the container 4, and then the introduction of such displacing elements as are required to cause the measured quantity to reach the level assigned therefor. For instance, it is customary in apparatus of this kind to provide graduation marks or other indicia for gallons, and in preparing the container 4, after such graduation indicia have been arranged, a gallon or other established standard quantity is measured in an ascertained accurate measure, and then deposited in the container 4. If the liquid level does not agree with the graduation, it is made to agree either by withdrawing one of the displacement rings and substituting a smaller one, or applying a larger one, or making whatever adjustment is required to cause the liquid level to correspond with the first graduation mark, and this process is repeated on up to the limit of the intended measuring capacity of container 4. The structure shown in the drawings is intended to measure ten gallons, one gallon being contained in each vertical space in container 4 of a height represented by the distance between the upper flat face of any one of the lugs 28 and the upper flat face of the next adjacent lug.

After the container 4 has been carefully calibrated in the manner just stated by the introduction of the rings 29 and 29′ as required, the apparatus is ready for use. Of course, in effecting the calibration as stated, either carefully calculated provision must be made for the introduction of the shell 33 or the shell must be omitted. Its presence or absence is not material to the effectiveness of the present invention.

The measuring container 4 having been calibrated as above indicated, the operator delivers through tube 10 to the container 4 a quantity of liquid to be dispensed, and in the instance of the structure illustrated in the drawings, at least ten gallons would be delivered, and perhaps a little more. Any additional amount drains back through the pipe 11 to the original source of supply, and the operator shifts the handle 23 to a position of engagement with the particular lug 28 representing the number of gallons to be delivered, for instance, as seen in Figure 1, seven gallons. The upper end of the sliding dispense tube will have been lowered by this movement from the position seen in Figure 2 to the plane of the graduation numbered seven. The operator then turns on the valve, not illustrated, of which nipple 17 is a part, and allows all of the liquid within the container 4 above the plane of the upper end of tube 12 to flow down through the tube and up through the discharge well 18, out through the port 16, and through the hose with which it is connected to the point of delivery. It will thus be seen that the quantity discharged instead of being what remains in the container after the drain back, as is true in some structures of the class to which this invention relates, is the amount of liquid within the container between the intake level of the drain back pipe 11 and the intake or upper end of pipe 12. Thus it is unnecessary to drain the measuring tank 4 at any time except when it is desired to deliver the full ten gallons.

Matters not claimed herein are made the subject matter of claims in my co-pending application filed July 13, 1928, designated by Serial No. 292,474.

What is claimed is:—

1. In liquid measuring and dispensing apparatus, the combination with a container, a tube movably mounted therein for controlling the discharge of measured quantities of liquid from the container, a handle connected with and adapted to be shifted for moving the tube, a lug extending from the handle and having one flat face and one inclined or cam face, and a series of fixed, spaced lugs adapted to receive the first-mentioned lug therebetween, the second-mentioned lugs having one inclined face and one flat face adapted to respectively receive contact of the inclined and flat faces of the handle-carried lug.

2. In a liquid measuring and dispensing apparatus, the combination of measuring means, a handle for actuating the same, a lug extending therefrom and having a cam face and a stop face, and a series of fixed spaced lugs adapted to receive the first-mentioned lug therebetween, each of the second-mentioned lugs having a corresponding cam face and a corresponding stop face adapted to receive contact respectively of the cam face and the stop face of the handle-carried lug.

In testimony whereof I affix my signature.

RUSSELL L. EDISON.